M. P. NEMMERS.
Hand Corn-Planters.

No. 144,919.                                    Patented Nov. 25, 1873.

Witnesses:                              Inventor:
E. T. Wolff                             M. P. Nemmers
                                        Per
                                        Attorneys.

UNITED STATES PATENT OFFICE.

MICHAEL P. NEMMERS, OF ST. DONATUS, IOWA.

IMPROVEMENT IN HAND CORN-PLANTERS.

Specification forming part of Letters Patent No. 144,919, dated November 25, 1873; application filed May 24, 1873.

*To all whom it may concern:*

Figure 1:
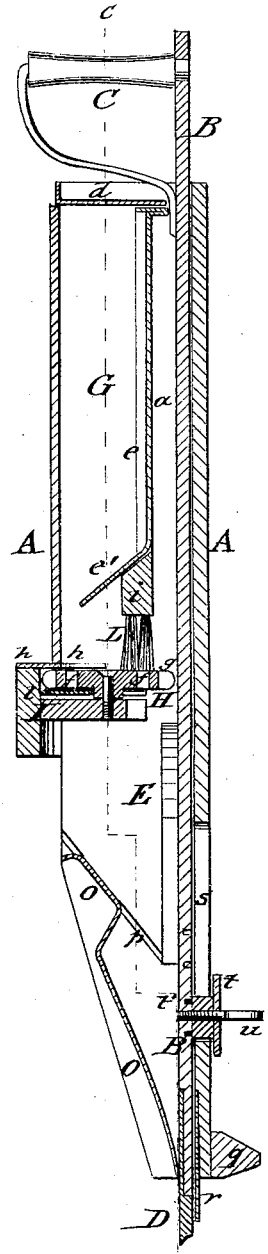
Figure 2:
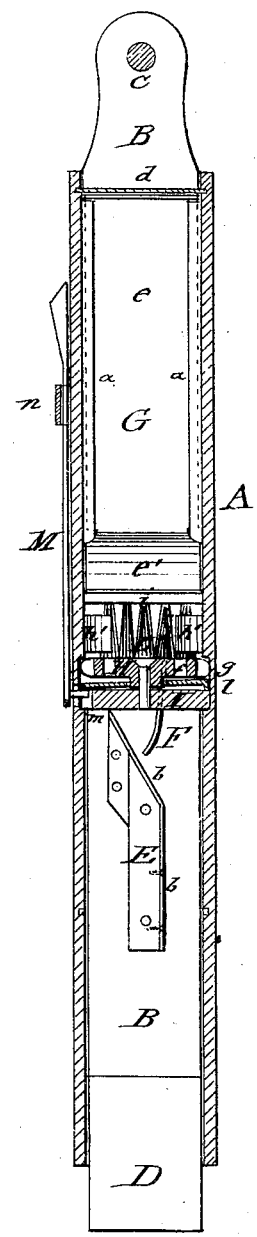
Figure 3:
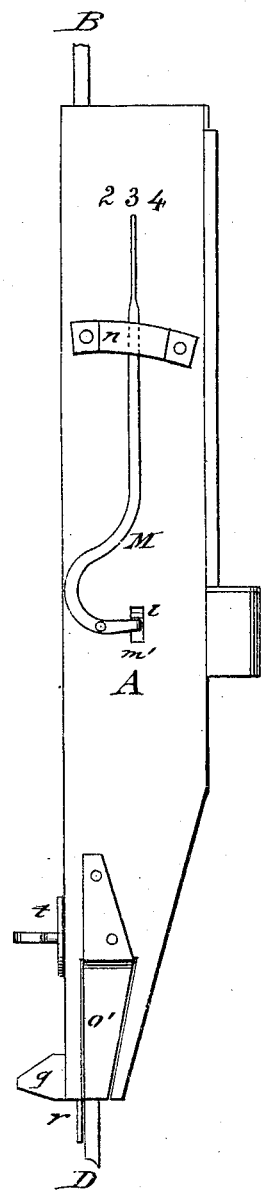

Be it known that I, MICHAEL P. NEMMERS, of St. Donatus, in the county of Jackson and State of Iowa, have invented a new and Improved Hand Corn-Planter, of which the following is a specification:

In the accompanying drawing, Figure 1 represents a vertical section of my improved hand corn-planter; Fig. 2, a vertical transverse section of the same on the line C C, Fig. 1; and Fig. 3, a side view of my corn-planter, showing lever arrangement for counting seed.

My invention is an improvement in hand corn-planters; and consists in a new arrangement of devices for actuating the seed-distributing disk and other connected parts, as hereinafter described.

In the drawing, A represents the outer case or box of the corn-planter, its upper portion being of oblong, quadrangular, prismatic shape, and the remainder half-prism, base upward. B is a vertically-sliding plunger, extending through the full length of case A along the rear side of the same, and guided by suitable longitudinally-arranged strips a. The plunger B has at its upper end a handle, C, and at its lower end the metallic piece D, with sharp edge to enter the soil and carry the seed before it. On B there is a spring-plate placed diagonally to act with a cam movement on the teeth of a horizontal revolving seed-cup disk. Above the latter another cam-spring, diagonally placed in the contrary direction, completes the distributer. A guide projection, F, curved toward wedge E, regulates jointly with it the revolving motion of the disk. The corn-chamber G is arranged in the upper part of case A, below handle C, and closed by top slide d. A vertical slide-piece, e, moving in grooves of strips a, has an inclined end, e', for the purpose of admitting a smaller quantity of corn to the revolving disk, and taking off the weight of the corn from the same, making thereby its motion easier and quicker. The revolving distributing-disk H is secured to horizontal piece or block I, which is screwed to the side of case A. The disk H is perforated by a certain number of holes, f, of such size as to admit freely the seed or corn. An equal number of spurs or teeth, g, project at the circumference of disk H, equidistant between the holes f. A sectional top plate, h, prevents any seed getting in sidewise between case A and disk H. The side guides h' protect in similar manner the other part of the disk H, compelling thereby the corn to settle in the perforations f of disk H. A double row of vertical brushes, L, is arranged close to guides h' and disk H, allowing thereby the seed to fill the holes f to the rim, and brushing off the other seed to drop into the other holes when the same are approaching toward them by the revolving of the disk H. The lateral piece i, into which the brushes L are set, serves also as additional support and rest to inclined slide e of the corn-chamber G. Below disk H is placed the plate l, inclined slightly toward disk H, and recessed below brushes L, so as to pass the contents for the holes f. The horizontal piece I is recessed below plate l for the same purpose, and has also a side groove, m, which, in connection with slot m' of case A, allows the projecting end of lever M, pivoted to the outside of case A, to act on plate l, and elevate or lower the same to correspond to the adjustment of the longer arm of the lever end in staple n at the figures 2 3 4. The nearer plate l approaches to disk H the smaller will be the number of seeds; the farther it is placed from it the greater will be the number which is admitted into perforations f of distributing-disk H.

The seeds pass down as each hole discharges its contents into the lower part of the planter, dropping on the inclined band-spring O, which slides in grooves p at the inside of case A. The seed is then carried into the ground by the descending plunger end. The spring action of band O presses its end firmly against the plunger, so that no seed can escape. It serves, also, on the upward motion of plunger B as scraper to clean the same from the adhering dirt. Similar spring-scrapers O' are placed in recesses and riveted to the sides of case A, cleaning the sides of plunger end D. A sidewardly-projecting shoulder, g, at lower end of case A rests on the ground, and the projecting blade r prepares the way for the plunger B, acting, also, as scraper for the rear side of plunger end D.

A slotted recess, s, on the rear side of case A, guides a set-piece, t, adjustable with its pins $t'$ in holes of the plunger B, and is connected firmly to it by set-screw $u$. The depth to which the plunger B is intended to penetrate the ground and deposit the seed can thereby be adjusted as the different soils require it.

Having thus described my invention, I claim as new, and desire to secure by Letters Patent—

1. The combination, with the recessed plate $l$, arranged beneath the disk H, of the lever M, working through the slot $m'$ of the hopper, as shown and described.

2. The combination, with the disk H, provided with the teeth $g$ and perforations $f$, of the projection F, the cam projection E, and spring $b$, as shown and described.

MICHAEL P. NEMMERS.

Witnesses:
    JOHN A. FRITZ,
    NICOLAS NEMMERS.